Aug. 20, 1968  K. S. CARMICHAEL  3,397,465
HEAT SHRINKING APPARATUS
Filed Aug. 10, 1966  5 Sheets-Sheet 1
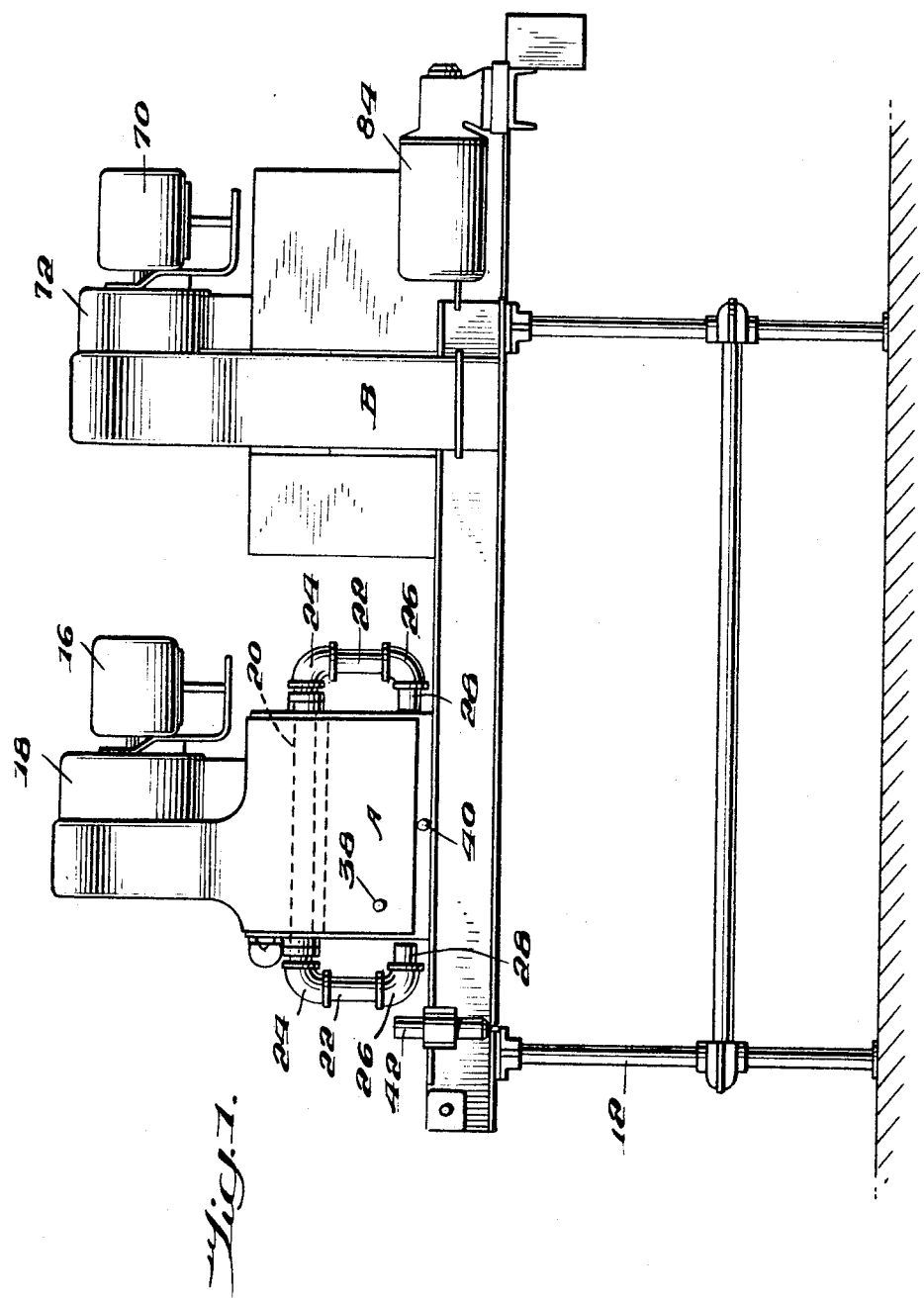
INVENTOR.
KEITH S. CARMICHAEL,
BY
AGENT

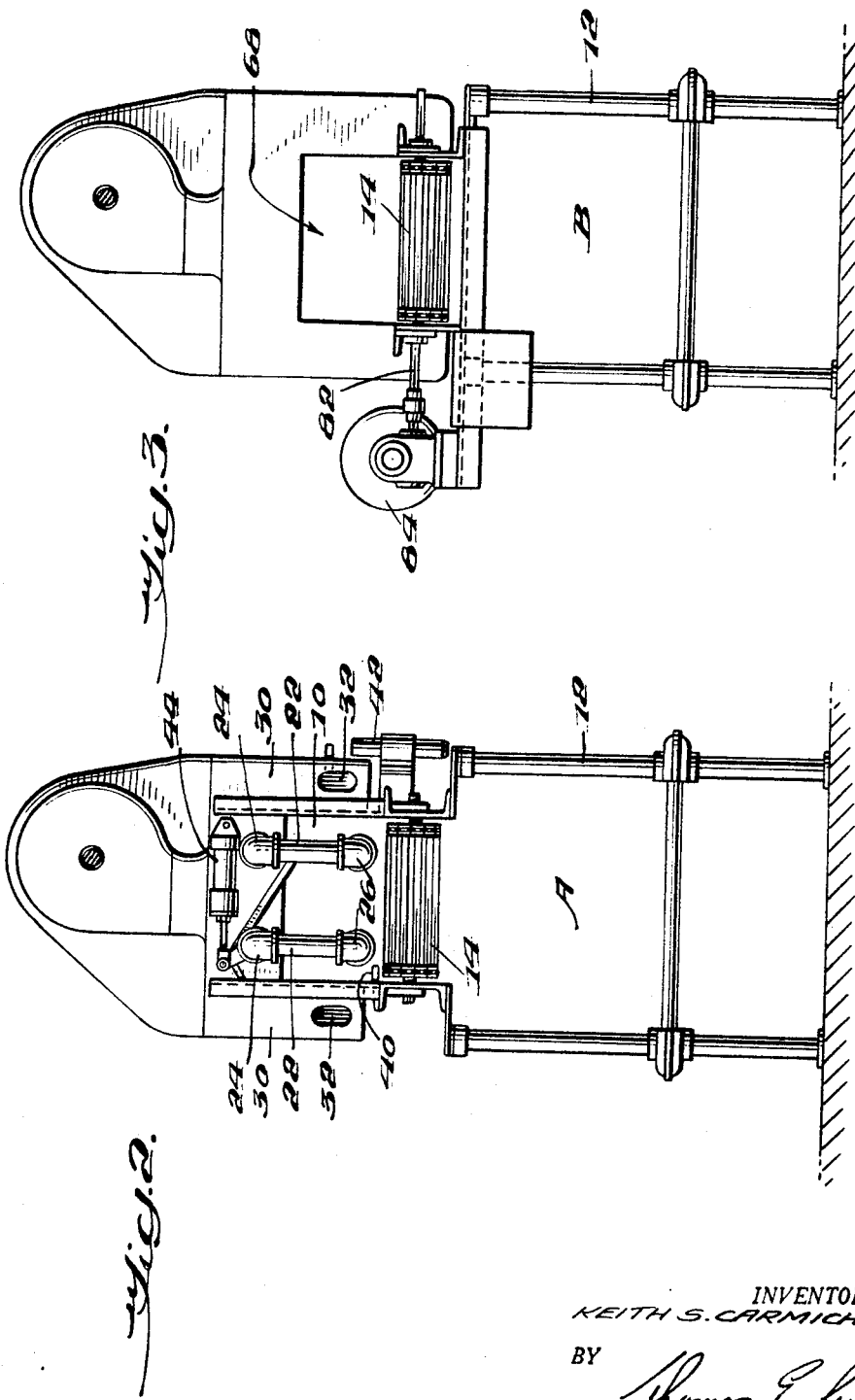

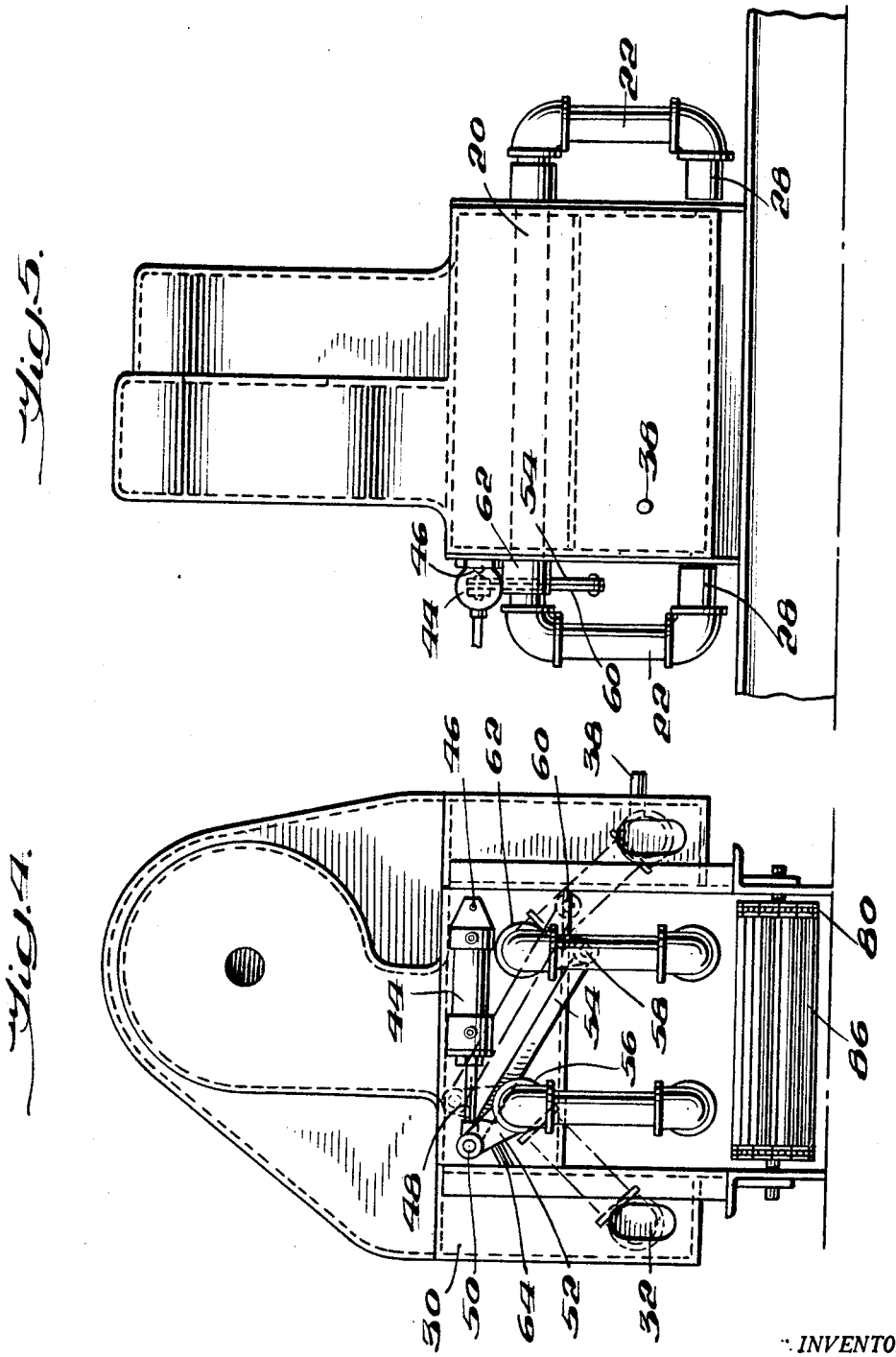

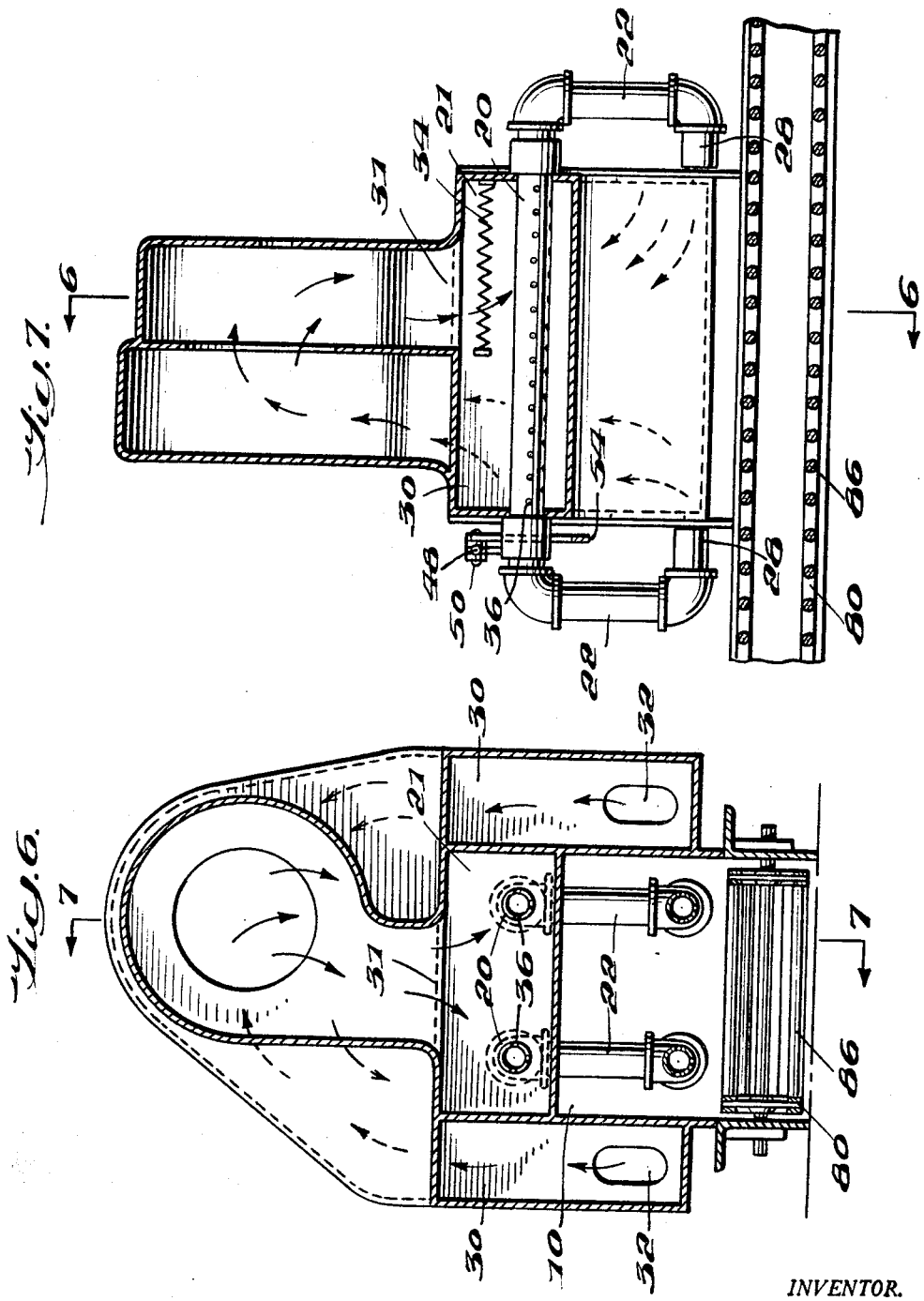

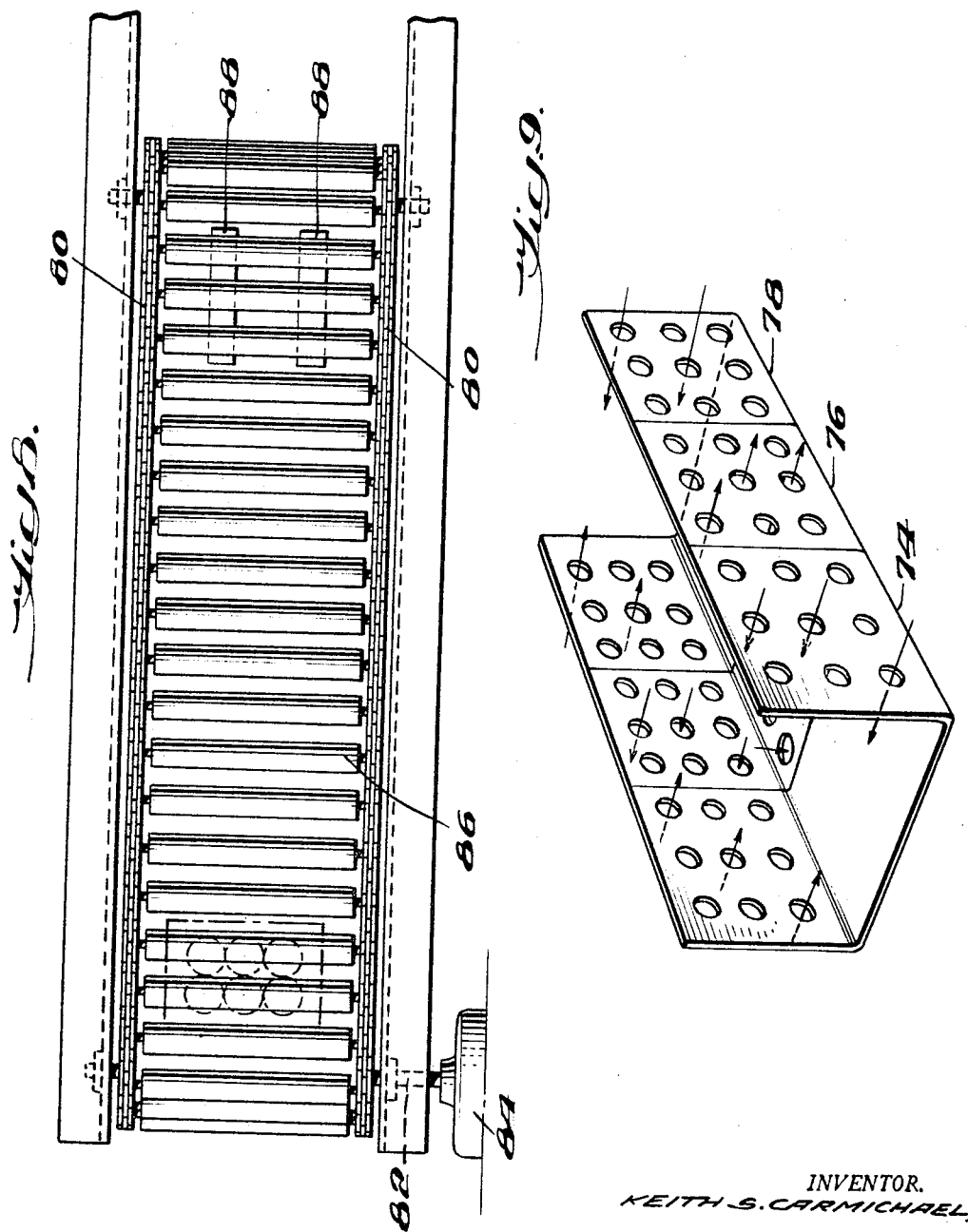

United States Patent Office 3,397,465
Patented Aug. 20, 1968

3,397,465
HEAT SHRINKING APPARATUS
Keith S. Carmichael, Wilmington, Del., assignor to E. I. du Pont de Nemours and Company, Wilmington, Del., a corporation of Delaware
Filed Aug. 10, 1966, Ser. No. 571,578
7 Claims. (Cl. 34—225)

ABSTRACT OF THE DISCLOSURE

Apparatus for directing heated air at substantially only the protruding areas of a sleeve of film overwrap to selectively preshrink these areas without adversely affecting the main body of the film overwrap.

---

This invention concerns packaging and more particularly it relates to an improved apparatus for uniformly shrinking a sleeve of heat shrinkable film about one or more articles.

A widely used packaging technique for merchandising articles involves placing the articles in a sleeve of heat shrinkable thermoplastic film overwrap and thereafter shrinking the film tightly around the articles. The shrinking operation is generally accomplished by simply passing the overwrapped articles through a conventional shrinking oven maintained at a given temperature. While this one step method appears to be convenient, it has several severe limitations.

The most prevalent of the disadvantages associated with single oven shrinking techniques centers on the restriction of using a single heat shrinking temperature. This disadvantage can be clearly appreciated when one considers the arrangement of the package and film overwrap prior to shrinking. In general, the arrangement comprises a grouping of the articles in substantially the center of a sleeve of the film which is open on both ends. The film generally extends beyond the articles at each end, thus creating protruding areas of film. In the shrinking oven, the protruding areas are shrunk tightly around the ends of the articles while the main body of the film overwrap shrinks around the articles.

However, the amount of shrinking that the film must undergo on various areas is not identical. In general, the protruding areas must shrink up to about 60 percent while the main body of the film shrinks only about 10–20 percent. Obviously, a higher temperature is required for shrinking the protruding areas than is required for the main body of film. However, when the single oven temperature is set high enough to sufficiently shrink the protruding areas, the properties of the main body of film such as tensile strength, impact resistance, and clarity undergo deterioration.

Thus, according to the present invention there is provided an apparatus for directing heated air at substantially only the protruding areas of a sleeve of film overwrap; whereby these areas are selectively preshrunk without adversely affecting the main body of the film overwrap. Furthermore, by using the present apparatus, less film overwrap is required per package since the protruding areas can be very tightly and efficiently shrunk around the package ends. Additionally, the apparatus of this invention can be used in combination with a conventional heat shrinking operation to inexpensively prepare a securely wrapped package having a high tensile strength, a high impact resistance, and good clarity.

Referring to the drawings:

FIGURE 1 is a side elevation view of the apparatus of this invention.

FIGURE 2 is an end elevation view of FIGURE 1 at the entrance to the Stage A oven.

FIGURE 3 is an end elevation view of FIGURE 1 at the exit to the Stage B oven.

FIGURE 4 is an enlarged detail view of FIGURE 3 depicting an additional feature of the present invention.

FIGURE 5 is a side elevation view of FIGURE 4.

FIGURE 6 is a sectional view along line 6—6 of FIGURE 7.

FIGURE 7 is a sectional view along line 7—7 of FIGURE 6.

FIGURE 8 is a top plan view of a conveyor of this invention.

FIGURE 9 is a perspective view of the internal bottom and sides of the oven of Stage B.

Referring to the drawings, and particularly to FIGURES 1, 2, and 3, a package heat shrinking apparatus is depicted comprising, in tandem relationship, a first Stage A and a second Stage B. Each stage is equipped with an individual heated air system and separate temperature controls. More particularly, the first stage comprises an oven having a tunnel cavity 10 therein which is open on both ends. The frame 12 supports both stages and a conveyor 14, which runs in a direction along the longitudinal axis of the tunnel cavity, serves to move film overwrapped packages continuously through both stages of the apparatus.

The individual heated air system in the oven of the first stage includes a motor 16 in combination with, and driving, a blower 18. Two parallel perforated air conveying ducts 20 are positioned above the tunnel cavity 10 in the heater box 21 which contains heating means 34. Each of the air conveying ducts 20 lie in a direction parallel to the longitudinal axis of the tunnel cavity 10 and protrude on each end beyond the oven confines. The protruding ends of both ducts are connected to four discharge ducts 22 by the right angle elbow joints 24. In this position, the discharge ducts are substantially vertical with respect to the tunnel cavity. In turn, the discharge ducts 22 are connected through the swivel right angle elbow joints 26 to the discharge ports 28 such that the discharge ports run in a direction substantially perpendicular to the discharge ducts.

Additionally, a circulating air duct system 30, containing the blower 18, communicates with the heater box 21 through the opening 31. Four intake ports 32, two of which are located at each end of the oven on opposite sides of the tunnel cavity, are provided for the circulating duct system 30. The intake ports at each end of the oven lie in a plane which is substantially perpendicular to the longitudinal axis of the tunnel cavity.

In operation, air is sucked into the circulating duct system 30 through the intake ports 32 by the blower 18. Subsequently, the air passes into the heater box 21 where it is heated to a controlled temperature by the conventional electrical resistant heating means 34. It is then forced into the air conveying ducts 20 through the perforations 36 and, thereafter, the heated air travels into the discharge ducts 22 and out into the tunnel cavity through the discharge ports 28. The arrows depicted in FIGURES 6 and 7 illustrate the normal air flow in the apparatus of this invention.

The fact that the discharge ports 28 are connected to the discharge ducts 22 by swivel elbow joints permits the heated air discharging from the discharge ports to be variably directed toward a given region across the width of the tunnel cavity. Thus, packages having various amounts of protruding areas can be accommodated by this apparatus since the heated air stream can be directed to exactly that region which it is desired to shrink. Additionally, such a connection permits the vertical elevation of the discharge ports to be adjusted in order to accommodate packages of various heights.

The present apparatus can also comprise a means for recirculating heated air when a package is not within the tunnel cavity. As illustrated in FIGURES 4 and 5 the discharge ducts 22 can be rotated into the position depicted by the dotted lines. In this position, the discharge ports 28 are substantially aligned with the intake ports 32 and the heated air issuing from the discharge ports discharges into the circulating air ducts 30 for recirculation to the blower. The power to the heating means 34 is, by conventional controller means not shown, regulated by the temperature probe 38 located at one of the intake ports 32 and, thus, when heated air is being recirculated, the power to the heating means is generally off.

While the air conveying ducts can be manually rotated from one position to another, it is generally preferred to accomplish this step in an automatic fashion. The illustrated automatic arrangement comprises a sensing means to detect when an overwrapped package is within the tunnel cavity and a rotating means that, upon a signal from the sensing means, rotates the air conveying ducts from one position to another.

The sensing means comprises a light source 40 and a photo cell 42. The light source is positioned within the tunnel cavity about half way between the exit and entrance. The light beam from this source is directed diagonally across the cavity toward the entrance. The photo cell is positioned at the tunnel entrance such that it can receive the light beam from the source.

The rotating means comprises a cylinder 44 pivotally mounted at the point 46 and having a piston rod 48. The rod 48 is pivotally connected at point 50 with two rigid members 52 and 54. The member 52 is an extension of the annular collar 56 which is positioned around the end of the air conveying duct and firmly attached thereto by means of a set screw. The member 54 is pivotally connected at the point 58 with a second member 60 which is similar to the member 52 and is an extension of the annular collar 62. In turn, the annular collar 62 is positioned around the end of the air conveying duct and firmly attached thereto.

By conventional electrical means not illustrated, the photo cell 42 is connected to a valve, not shown, which controls the cylinder 44. The cylinder itself can be either pneumatically or hydraulically operated.

In operation, the passage of a package into the tunnel cavity interrupts the light beam thus causing the photo cell 42 to signal the valve which actuates the cylinder 44. The rod 48 is forced in a direction away from the cylinder toward the position shown by the solid line in FIGURE 4. The adjusting screw 64 serves to limit the rod travel by contact with the member 52. Movement of the rod 48 causes the air conveying ducts 20 to rotate about their longitudinal axes and, correspondingly, the air discharge ducts 22 at each end of the tunnel cavity to rotate about the same axes into the position shown by the solid lines in FIGURE 4. In this position heated air emanating from the discharge ports 28 is directed into the tunnel cavity and toward the protruding areas of the overwrapped package. After the package has passed, the resumption of the light beam to the photo cell results in a signal which causes the air conveying ducts to be rotated back into the dotted position shown in FIGURE 4. In this position, the heated air is discharged into the air circulating ducts. As indicated, the two ducts at the same end of the tunnel cavity rotate in the opposite sense.

Other sensing systems such as photo cells positioned at both the exit and entrance to the tunnel cavity or a time actuated control valve for the cylinder can also be used. Additionally, the valve controlling the cylinder can be manually operated and, thus, the use of a sensing device avoided altogether.

After the protruding areas of the package are heat shrunk in the oven of Stage A, the package is conveyed to Stage B wherein the film comprising the main body of the package is shrunk. Referring again to the drawings, Stage B comprises a conventional heat shrinking oven having a cavity 68 with the conveyor 14 running longitudinally therethrough. A motor 70 and blower 72 are also illustrated. Though not particularly illustrated the oven also contains an individual heated air system for supplying heated air to the oven confines. Reference is made to U.S. Patent 3,222,800, issued on Dec. 14, 1965 to Siegel et al. for a comprehensive disclosure of a suitable apparatus, including a heated air system, which can be used as the Stage B oven in the present invention.

While the design for heated air flow in the Stage B oven cavity is not limited, a preferred design that is especially effective in uniformly shrinking the package is illustrated in FIGURE 9. The cavity in the oven is divided into three sections, 74, 76, and 78, the top, bottom, and walls of each section being comprised of solid panels or diffuser plates. The air flow pattern through the plates in each section is indicated by the arrows. For clarity, the plates or panels on the top surface of the oven have not been illustrated. Heated air enters the oven from suitable ductwork, such as is described in the aforementioned patent, through the diffuser plates on the sides and top of the entrance section 74 and on the sides, and bottom of the exit section 78. The heated air is exited from the oven, for recirculation, through the diffuser plates on the sides and bottom of the center section 76. As is customary, dampers can be positioned in the ductwork to control the air flow. Additionally, the diffuser plates can be removable and thus replaceable by varied patterned plates so that the most desirable air flow pattern can be employed for a given package. A change in the hole size and distribution in the diffuser plate changes the pattern, volume, and velocity of the entering and exiting air.

While a variety of well known conveying means can be employed in the present apparatus, several particular features are desirable. Primarily, it is convenient if the same continuous conveyor is used for transporting the package through both Stage A and Stage B. Additionally, in order to achieve uniform shrinking of all sides of the package in Stage B, the conveying means should permit all of the area of the bottom side of the package to be exposed to the entering hot air.

The aforementioned U.S. Patent 3,222,800 discloses a conveying means comprising laterally spaced longitudinally extending conveying members that permits the film on the bottom of the package to be effectively shrunk. Similarly, the conveying means illustrated in FIGURE 8 of the present invention accomplishes the desired result. This conveying means comprises a pair of chains 80 driven from a common shaft 82 on which are secured customary drive sprockets. The shaft in turn is driven by the motor 84. A series of conveyor rollers 86 are transversely secured between the chains 80. The conveyor rollers can be fabricated from solid epoxy impregnated fiber glass rods which are drilled at each end in a manner suitable for fitting around steel pins which extend from the chains in a direction transverse to the run of the chains. The steel to epoxy impregnated fiber glass bearing surfaces require no lubrication which thus eliminates one source of contamination in such a packaging operation. Also, the rollers are heat resistant which permits continuous operation under cycling heating and cooling conditions with no adverse effects upon the operation or maintenance of the rollers.

As the conveying means advances the overwrapped package through Stage A and the first section of Stage B, the package remains in a fixed position relative to the rollers on which it rests. However, as illustrated in FIGURE 8, a flat, elastomeric material 88 is mounted beneath the conveyor rollers 86 in a position that corresponds to the last two sections of the Stage B oven. The elastomeric material is mounted so that it bears upon the lowest peripheral portions of the conveyor roller surfaces as the rollers pass over the flat surfaces. This engagement causes the rollers to rotate which accelerates the package being conveyed exposing all of the surface on the package bottom to the hot air from the bottom diffuser panel of the third section of the Stage B heat shrinking oven. This feature permits uniform bottom overwrap shrinkage as well as uniform shrinkage on the package's top and sides.

What is claimed is:

1. In an apparatus for heat shrinking the protruding areas of a sleeve of heat shrinkable film overwrap on a package comprising an oven having therein a tunnel cavity open on both ends, a conveying means for advancing a package longitudinally through the tunnel cavity, and a heated air system, separate from the tunnel cavity confines, comprised of air intake means, air heating means, a circulating duct system, and heated air conveying ducts; the improvement comprising, in communication with the heated air conveying ducts, four discharge ducts, two of said ducts being positioned at each end of the tunnel cavity and on opposite sides thereof said ducts having discharge ports at one end located at the entrance and exit ends of the tunnel cavity, said discharge ducts being substantially vertical with respect to the tunnel cavity positioned to discharge heated air into said tunnel cavity such that when a package is within said cavity substantially all of the air discharging therefrom is directed toward the protruding areas of the sleeve of heat shrinkable film overwrap, said discharge ports running perpendicular to said ducts wherein said discharge ducts are joined at substantially right angles to the air conveying ducts which in turn lie in a direction substantially parallel to the longitudinal axis of the tunnel cavity.

2. The apparatus of claim 1 wherein the discharge ports are connected to the discharge ducts by means that permit the air discharging therefrom to be variably directed across the tunnel cavity width.

3. The apparatus of claim 2 wherein the discharge ports are connected to the discharge ducts by means of swivel elbow joints.

4. The apparatus of claim 1 having in communication with the heated air intake means, four intake ports, two of said intake ports located at each end of the oven and on opposite sides of the tunnel cavity, said intake ports being in a plane which is substantially perpendicular to the longitudinal direction of the tunnel cavity with the position of said intake ports being such that rotation of the nearest discharge duct in a plane parallel to the plane in which the intake ports lie and about the longitudinal axis of the air conveying ducts brings the discharge ports of the discharge ducts into substantial alignment with the intake ports, and rotating means for so rotating the discharge ducts, the rotation of the ducts at the same end of the tunnel cavity being in the opposite sense.

5. The apparatus of claim 4 containing a sensing means for detecting when a package is within the tunnel cavity, said sensing means being connected to said rotating means such that a signal from said sensing means actuates said rotating means.

6. The apparatus of claim 5 wherein the sensing means comprises a light source and a photo cell.

7. An apparatus for heat shrinking a sleeve of heat shrinkable overwrap on a package comprising, in tandem relationship, two stages:

(1) Stage A, an oven for heat shrinking the protruding areas of the sleeve of film overwrap, comprised of a tunnel cavity open on both ends, a conveying means for advancing the package longitudinally through the tunnel cavity, and a heated air system separated from the tunnel cavity confines, said heated air system comprising air intake means, air heating means, a circulating duct system, heated air conveying ducts, and, in communication with the heated air conveying ducts, discharge ducts, having discharge ports at one end, located at the entrance and exit ends of the tunnel cavity such that, when the package is within the cavity, substantially all of the air discharging therefrom is directed toward the protruding areas of the sleeve of heat shrinkable film overwrap, and (2) Stage B, an oven having a cavity therein for heat shrinking the total film overwrap of the package, comprised of means for conveying the package through the oven cavity, an entrance section, a center section, and an exit section, a heated air system for supplying heated air to the oven cavity with means for directing controlled temperature air into the oven cavity from the sides and top of the entrance section and the sides and bottom of the exist section and means for withdrawing heated air out of the oven cavity from the sides and bottom of the center section, said conveying means being such that all sides of the package are effectively exposed to the heated air.

References Cited

UNITED STATES PATENTS

| | | | |
|---|---|---|---|
| 3,115,735 | 12/1963 | Harrison | 53—184 |
| 3,120,728 | 2/1964 | Snow et al. | 53—184 XR |
| 3,197,940 | 8/1965 | Spangler | 53—184 XR |

FOREIGN PATENTS 970,406   9/1964   Great Britain.

KENNETH W. SPRAGUE, *Primary Examiner.*